(12) United States Patent
Mahaffey (10) Patent No.: US 7,479,882 B2
(45) Date of Patent: Jan. 20, 2009

(54) RFID SECURITY SYSTEM AND METHODS

(75) Inventor: Kevin Mahaffey, San Diego, CA (US)

(73) Assignee: Flexilis, Inc., Los Angeles, CA (US)

(*) Notice: Subject to any disclaimer, the term of this patent is extended or adjusted under 35 U.S.C. 154(b) by 229 days.

(21) Appl. No.: 11/397,521

(22) Filed: Apr. 3, 2006

(65) Prior Publication Data

US 2007/0090954 A1 Apr. 26, 2007

Related U.S. Application Data

(60) Provisional application No. 60/671,790, filed on Apr. 14, 2005.

(51) Int. Cl.
*G08B 13/14* (2006.01)

(52) U.S. Cl. ............... 340/572.3; 340/10.51; 340/572.7; 340/572.8

(58) Field of Classification Search ............ 340/572.3, 340/10.51, 572.7, 10.34, 572.8, 568.1, 568.7, 340/572.1; 235/492, 487; 174/350; 343/841
See application file for complete search history.

(56) References Cited

U.S. PATENT DOCUMENTS 6,121,544 A * 9/2000 Petsinger .................... 174/353

| 6,785,739 | B1 * | 8/2004 | Tutt et al. ............... 709/245 |
|---|---|---|---|
| 7,218,233 | B2 * | 5/2007 | Bon ..................... 340/572.8 |
| 7,295,120 | B2 * | 11/2007 | Waldner et al. ......... 340/572.7 |
| 2003/0168514 | A1 | 9/2003 | Rancien et al. |
| 2005/0128085 | A1 | 6/2005 | Bon |
| 2006/0017570 | A1 | 1/2006 | Moskowitz et al. |

OTHER PUBLICATIONS

Radio Frequency Identification Technology in the Federal Government (Report to Congressional Requesters) May 2005.

* cited by examiner

*Primary Examiner*—Brent Swarthout
(74) *Attorney, Agent, or Firm*—Hani Z. Sayed; Rutan & Tucker, LLP (57) ABSTRACT

A Radio Frequency Identification (RFID) tag security device that selectively enables the readability of a RFID tag in a passport or book. The device has an RFID tag on one page and at least one layer of conductive material on a different page such that the tag and conductor are in parallel planes when the book or passport is closed and separated when it is open. Multiple conductors may be used on covers or pages surrounding the tag such that the tag is sandwiched between conductive materials when the book or passport is closed and loose when the book or passport is open. Optionally, the tag can be coupled to one of the conductive layers with a spacer placed between the tag and conductor. A two-part RFID tag assembly is also disclosed to have strong adhesives on both sides and weak bonds to detachably couple the two parts together.

8 Claims, 4 Drawing Sheets

RFID SECURITY SYSTEM AND METHODS

CROSS-REFERENCE TO RELATED APPLICATIONS

This application claims priority from U.S. Provisional Patent Application No. 60/671,790, filed on Apr. 14, 2005, which is hereby incorporated by reference in its entirety.

FIELD OF THE INVENTION

The field of the invention is RFID security.

BACKGROUND OF THE INVENTION

Radio Frequency Identification (RFID) is an automatic identification method and technology, which relies on storing and remotely retrieving data by using devices called RFID tags or transponders. An RFID tag is a small object that can be attached to or incorporated into a product, animal, or person. RFID tags contain circuits and antennas to receive and respond to radio-frequency queries from an RFID transceiver.

A minimal RFID system usually consists of at least a tag and a tag reader. The purpose of the RFID system is to transmit data to and from a mobile device, called a tag, which is read by an RFID reader and processed according to the needs of a particular application. The data transmitted by the tag may provide identification, location, or other information.

In a typical RFID system, individual objects are equipped with a small, inexpensive tag. The tag contains a transponder with a onboard memory that contains some sort of information used to satisfy the requirements of the system. Often this information is a unique identification code. The tag can also perform cryptographic functions to prevent the tag's security from being compromised. The RFID reader (or interrogator), emits a signal activating the RFID tag so it can read and write data to it. When an RFID tag passes through a read zone, the tag detects the reader's activation signal and exchanges data with the reader. The reader then decodes the data encoded in the tag's integrated circuit and the data is processed appropriately. There are various standards governing the specific operation of a given RFID system, usually covering the system's operating frequency, power transfer mechanism, command structure, cryptographic capability, and other details.

RFID tags can either be passive, semi-passive (also known as semi-active), or active.

Passive RFID tags have no internal power supply. The minute electrical current induced in the antenna by the incoming radio frequency signal provides just enough power for the CMOS integrated circuit (IC) in the tag to power up and transmit a response. Most passive tags signal by backscattering the carrier signal from the reader. This means that the antenna has to be designed to both collect power from the incoming signal and also to transmit the outbound backscatter signal. The response of a passive RFID tag is not always just an ID number; the tag chip can contain nonvolatile EEPROM (Electrically Erasable Programmable Read-Only Memory) or other memory for storing data. Passive tags have practical read distances ranging from about 2 mm (ISO 14443 standard) up to a few meters (EPC and ISO 18000-6 standards) depending on the chosen radio frequency and antenna design/size.

Semi-passive RFID tags are very similar to passive tags except for the addition of a small battery. This battery allows the tag IC to be constantly powered, which removes the need for the antenna to be designed to collect power from the incoming signal. Antennas can therefore be optimized for the backscattering signal.

Unlike passive and semi-passive RFID tags, active RFID tags (also known as beacons) have their own internal power source which is used to power any ICs and generate the outgoing signal. They are often called beacons because they broadcast their own signal instead of modulating the reader's signal in response.

A controversial use of RFID technology includes inserting RFID tags in passports to facilitate the retrieval of passport information by border officials. An RFID tag embedded in a passport can contain personal and confidential information including name, photo, passport number and date of birth.

Without proper security measures, information contained in RFID tags of passports can be surreptitiously read from substantial distances. Additionally, the ability to automatically identify the nationality of a given passport could lead to the development of bombs or terrorist devices that can authoritatively target a given country's citizens.

Consequently, there have been many public debates on the security issues of RFID passports. Thus, there is a need for a security device to implement in new and existing passports as well as a method for installing such a device.

All referenced patents, applications and literatures are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

SUMMARY OF THE INVENTION

The present invention provides apparatus, systems, and methods in which a Radio Frequency Identification (RFID) tag security device is provided to selectively enable the readability of a RFID tag from a default disable state. Contemplated devices have at least one layer of electrically conductive material acting as a shield positioned in parallel on at least one side of a RFID tag. These shield(s) are contemplated to interfere and/or block radio frequency transmissions between the RFID tag and a RFID reader.

In one contemplated embodiment, the device is configured in a book-like fashion where one shield is on a page or cover and can open and close to selectively enable or disable the RFID tag located on a different page or cover of the passport or book. When the book or passport is closed, the shield and tag are in parallel planes and the tag reading is disabled. When the book or passport is open, the shield and tag are separated and in non-parallel planes, thereby allowing the tag to be read.

Another contemplated embodiment includes two shields on covers or pages surrounding the page containing an RFID tag. When the book or passport is closed, the shields surround the tag and prevent it from being read. When open, the shields are physically separated from the RFID tag and allow it to be read.

Among the many different possibilities contemplated, the device may also have a spacer layer coupled in parallel to the RFID tag in order to minimize the shield's interference of transmission when a user disables the shielding function of the device. The spacer allows an RFID tag to be coupled to the shield layer on the same binding/page rather than having to be on a physically separate mounting surface. Without the spacer, a RFID tag layered directly on a conductor would not be able to be read. Contemplated spacer layers can comprise a ferrite-based material or another material with similar properties, namely, high magnetic permeability and high resistivity. Alternatively, the spacer layer can comprise a non-conducting dielectric material. The specific choice of material depends on the specific operational frequency of the RFID system and the method of power transfer.

One contemplated embodiment contains a passport or book-like medium containing shields embedded into its covers or pages. The embodiment contains a RFID tag layered on top of a spacer which is, in turn, positioned on top of one of the conductors such that when the book or passport is closed, the conductors surround the RFID tag, disabling it, but, when the book or passport is open, the conductors are separated, allowing the RFID tag to be read.

Among the many possible methods contemplated for installing a RFID shield device onto a book or passport, this invention also contemplates a two-part RFID tag assembly to facilitate the installation of the RFID tag, one or more shields, and an optional spacing layer. Contemplated two-part assembly has two detachable parts (a first subassembly and a second subassembly, or hereinafter referred to as first part and second part) coupled together. One part contains a shield, the other part contains a tag and can additionally contain a conductive shield and a spacing layer.

In still further preferred embodiments, the preferred two-part assembly has strong adhesives on both sides to adhere to opposing pages in a passport or book. The contemplated method comprises inserting the assembly between opposing pages and then closing the passport or book, thereby ensuring adhesion of the assembly to pages on both sides of the assembly. Then, by opening the passport or book, the two parts of the assembly detach from each other. The first part remains adhered onto one page while the second part remains adhered to a corresponding position on the opposing page. Whenever the passport or book closes, the assembly effectively realigns and reading of the tag is disabled (and where two conductive shields and a spacer layer is present, the realignment forms a sandwiched configuration, protecting the RFID tag in the middle from being surreptitiously read). This two-part assembly provides relatively easy and fast installation of RFID tags along with corresponding shields onto a passport or book.

Various objects, features, aspects and advantages of the present invention will become more apparent from the following detailed description of preferred embodiments of the invention, along with the accompanying drawings in which like numerals represent like components.

DETAILED DESCRIPTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Thus, the detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments that the spirit of the invention also intends to encompass.

The inventor has discovered a method of preventing an unauthorized reading of a RFID tag in a passport or book by providing a RFID shield assembly that can be included at time of the book or passport's manufacture or relatively easily retrofitted onto an existing medium. The shield assembly allows the passport holder to selectively enable and disable the shielding of the RFID tag. When the passport or book is in a closed position, the tag is disabled. When the passport or book is open, the tag is able to be read. Such security settings are intuitive for the user as the book or passport will likely be closed when not in use and open when in use. In addition, the inventor has discovered a method and a device relating to RFID assemblies that are relatively easy to install in a passport or book.

One of the main ideas of the inventive subject matter is to provide a default disabled state where a RFID reader cannot read a RFID tag in a passport or book, by using at least one conductive shield positioned in parallel to the RFID tag when the passport or book is in a closed position. When the passport/book holder wishes to allow a reading of the tag, the holder simply open the passport, exposing the RFID tag for reading.

For inductively coupled RFID tags (those powered by an alternating magnetic field), the shield attenuates the magnetic field significantly by forming eddy currents in the highly conductive material such that the RFID tag is not able to become powered up while the shield is in place. For electric-field coupled RFID tags, the two parallel conducting shields approximate a fully closed container, also significantly attenuating any energy that could power up the tag. Additionally, the close proximity of a conductive shield to an antenna can change the tag's resonant frequency, preventing proper tag operation.

Because these shields are effective in shielding radio frequency transmissions between a reader and a RFID tag, when one shield is removed from the sandwich configuration, the remaining shield on the underside of the RFID tag can still negatively interfere with authorized reading. Also, when the RFID tag and the conductive shield is coupled on the same page/binding, the shield can negatively interfere with authorized reading. As will be described in more details below, the preferred device optionally has a spacer layer in between the tag and the remaining shield so as to allow proper reading of the RFID tag when the passport/book is open.

One contemplated spacer layer utilizes a ferrite-based or an equivalent material with high magnetic permeability and high resistivity. Ideally, the specific material should be flexible and durable. This material separates a RFID tag from the conducting shield and prevents the conducting shield from disturbing the energy used to power up the tags (i.e., prevents the formation of eddy currents directly adjacent to the RFID tag).

An alternative embodiment utilizes a non-conducting dielectric spacer to physically separate the conductor from the RFID tag. This also minimizes or prevents a conductive shield layer, on the underside of the RFID tag when the passport/book is open, from negatively affecting an authorized reading.

As used herein, the term "spacing layer" is used interchangeably with "spacer," and "spacer layer."

As used herein, the term "front binding" refers to the passport/book binding on the left side as shown in the drawing figures. The term "back binding" refers to the passport/book binding on the right side, as shown in the drawing figures.

As used herein, the term "conductive shield layer" is used interchangeably with "conductor," "shield," "conductive layer", and "conductor shielding."

As used herein, the term "sandwiched" in conjunction with spatial relationship between at least three layers of material refers to having three layers in parallel with each other and does not infer whether or not the parallel layers are directly contacting each other. For example, when a first conductive layer is positioned to "sandwich" a RFID tag with a second conductive layer, the two conductive layers and the RFID tag are in parallel with each other. Furthermore, in this example the RFID tag is positioned in the middle, with the first and second conductive layers positioned relative to its top side and bottom side, respectively. The RFID tag can or cannot directly contact any one of the two conductive layers.

As used herein, the term "interfere" in conjunction with a radio frequency transmission refers to at least one of: 1. blocking such transmission, 2. minimizing such transmission, 3. negatively affect the quality of such transmission, and 4. disrupting such transmission.

Figure 1:
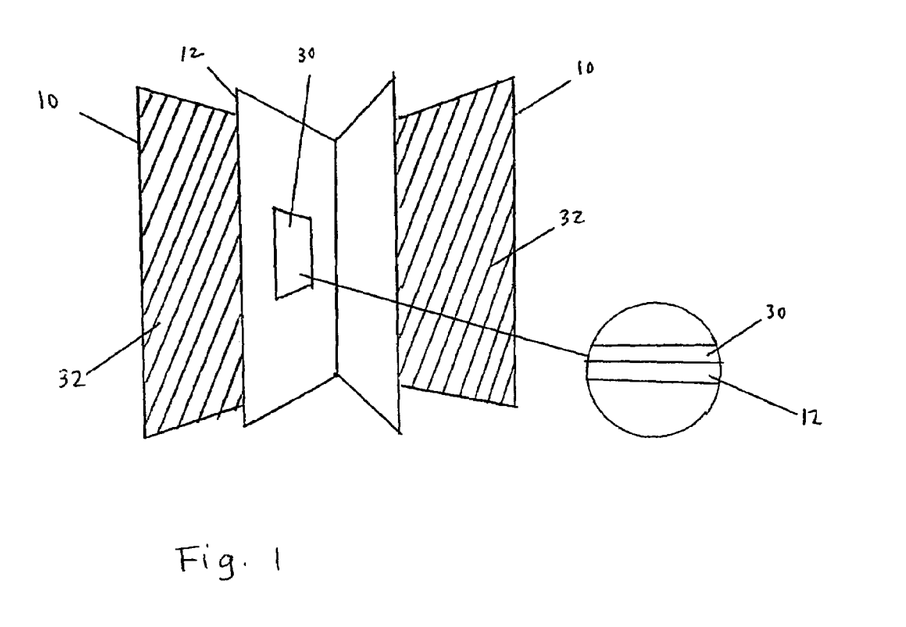
FIG. 1 is a perspective view of a first embodiment of a RFID security system having two conductor shields.

In FIG. 1, a RFID passport has bindings 10, pages 12, and a RFID tag 30 coupled to an inside page. As shown here, both the front and back bindings 10 have a conductive shield layer 32 This conductive shield layer 32 can be embedded within the bindings 10 during the manufacturing of the bindings 10, or it can be separately coupled or retrofitted onto the bindings 10. In this embodiment, no spacer layer is needed. A spacer layer is generally necessary to prevent the RFID tag from directly contacting a conductive shield layer 32 during an authorized reading, or when the passport/book is open. Here, since the RFID tag 30 is placed on a center page 12 and would not directly contact the conductive shield layer 32 when in an open-book position, no spacer layer is needed.

Figure 2:
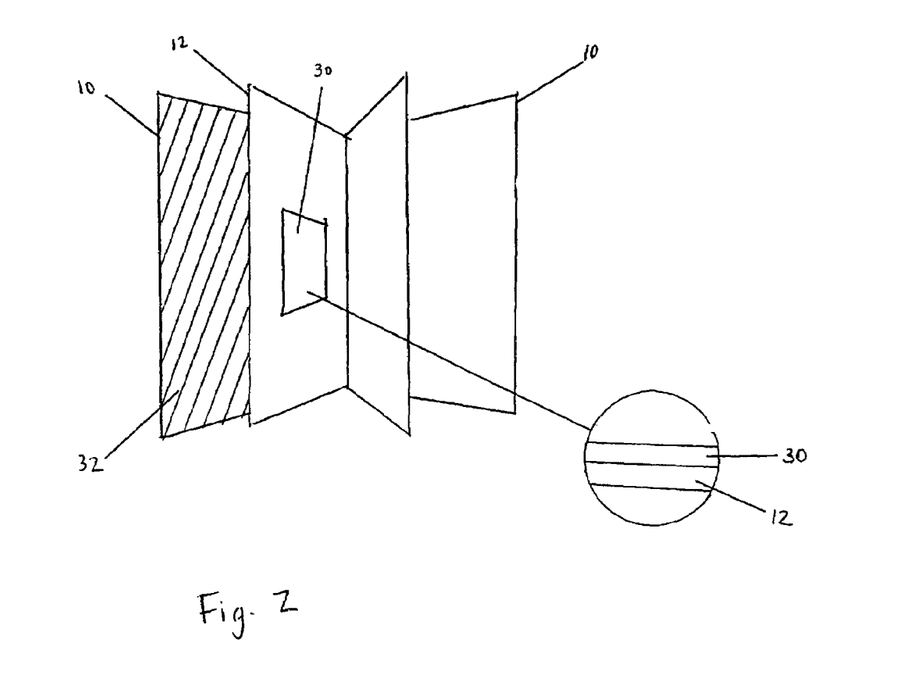
FIG. 2 is perspective view of a second embodiment of a RFID security system having one conductor shield.

In FIG. 2, this embodiment employs only one conductive shield layer 32 on a front binding 10. The RFID 30 tag is positioned on a center page 12 and does not come in contact with conductive shield layer 32 in both the open-book and and close-book configuration.

Figure 3:
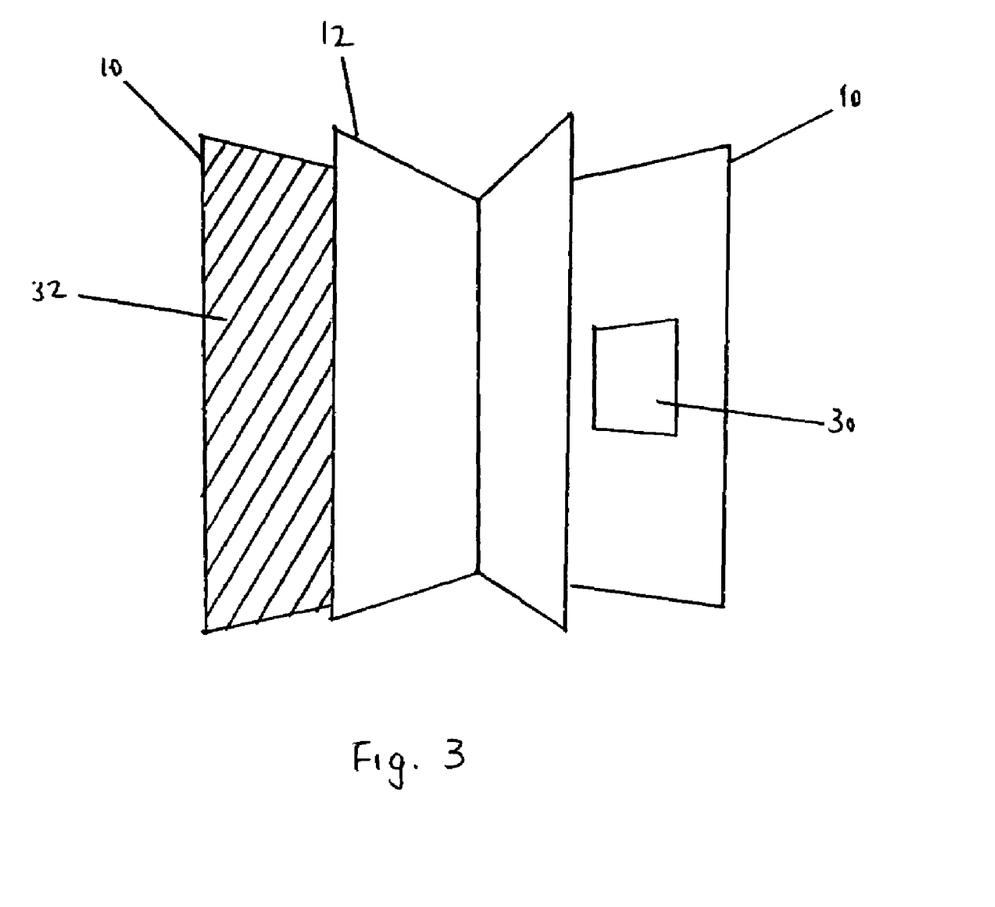
FIG. 3 is a perspective view of the second embodiment where the RFID tag is located on the binding.

In FIG. 3, this is another embodiment where only one conductive shield layer 32 is needed. As shown in FIG. 3, a front binding 10 has conductive shield layer 32, and the RFID tag 30 is positioned on the back binding 10, which does not have a conductive shield layer 32. As discussed above, no spacer layer is necessary in this embodiment.

Figure 4:
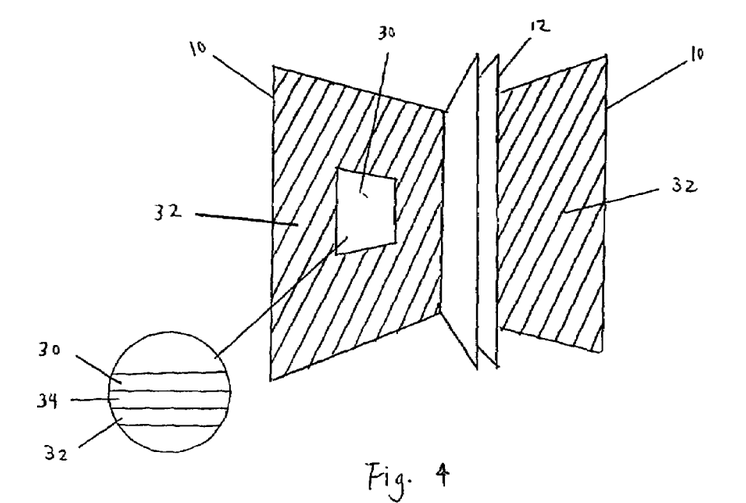
FIG. 4 is a perspective view of another embodiment where a spacer layer is disposed between the RFID tag and the conductor shield.

In FIG. 4, both front and back bindings 10 have conductive shield layers 32. A RFID tag 30 is positioned on the front binding 10, having a spacer layer 34 between the tag 30 and the conductive shield layer 32 to prevent the tag from directly contacting the conductive shield layer 32. These layers can be bound together using known methods such as chemical adhesives. It should be noted that in an embodiment like this where the tag 30 is positioned on the binding 10 with a spacer layer 34 in between the tag 30 and the conductive shield layer 32, two conductive shields are necessary to disable the readability of the tag 30 when the passport/book is closed.

Contemplated shields can be constructed of any suitable material, in any suitable configuration. For example, the conductor shielding can take the form of a foil, solid core material, a stranded core material, a sheet, or a mesh with openings much smaller than the wavelength of the signal to be attenuated. Of particular interest are shields containing a metal or other highly conductive material, including for example copper or aluminum. Preferred shields are also sufficiently thin and flexible so that implementing the shields in a passport does not inconveniently cause the passport to be relatively bulky, heavy, or stiff.

Contemplated spacer layer can be constructed of any suitable material, in any suitable configuration. Preferred spacer layers are thin and flexible. An example of such spacer layer is the commerically available elastomeric ECCOPAD® isolators by Emerson & Cuming Microwave Products, Inc. (28 York Avenue, Randolph, Mass. 02368).

Contemplated shields 32, spacing material 34, and RFID tags 30 can be incorporated into the binding 10 of the passport during manufacturing of the binding. Alternatively, shields 32 can be separately manufactured from the binding 10 and capable of retrofitting a passport or book. In the latter case, the shields 32 can be individual adhesive layers attachable to pages of a passport or book. Alternatively, the shields 32 can be coupled together in a book-like fashion, or configured as a passport jacket.

When at least one shield 32 is configured to cooperate with the opening and closing of a passport/book, the security function is considered engaged (i.e., operational) when at least one shield 32 is in parallel and in close proximity with the RFID tag 30 (i.e., a closed book). Similarly, the security function is considered disengaged when at least one shield 32 is moved away from the RFID tag 30 and no longer parallel to the other shield 32 (i.e., an open book).

Figure 5:
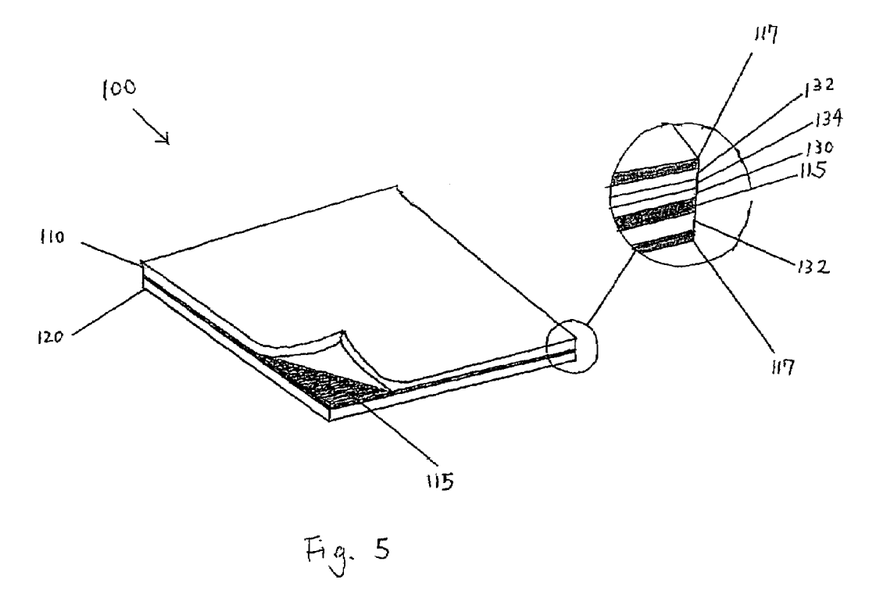
FIG. 5 is a perspective view of a two-part assembly according to an aspect of the inventive subject matter.

In FIG. 5, a two-part RFID tag assembly 100 provides relative fast and easy installation of a secured RFID tag with shields. The assembly 100 generally has top side and a bottom side where strong adhesive layers 117 are disposed. The assembly 100 comprises first part 110 detachably coupled to second part 120 by a weak bond. An example of a weak bond is illustrated by weak connector 115.

First part 110 includes multiple layers bound together. These layers include: a strong adhesive layer 117, a conductive shield 132, a spacer layer 134, and a RFID tag 130 (although having conductive shield 132 and spacer layer 134 in the first part 110 are optional). If conductive shield 132 and spacer 134 are not included in first part 110, a one-conductor FRID security system is created, as opposed to a two-conductor RFID security system. Second part 120 includes a strong adhesive layer 117 and a conductive shield 132. First part and second part are contemplated to couple together by a weak connector 115.

One major purpose of this weak connector 115 is to keep the first part 110 and the second part 120 coupled together during installation of the assembly to a passport or book. The connection made by the weak bond shall be sufficiently weak to allow the first part 110 to detach from the second part 120 when opposing pages to which the strong adhesive layers 117 adhere to open. In other words, the bond as illustrated by weak connector 115 is weaker than the bonding created by strong adhesive layers 117. By having a two-part assembly as described, the process of installing a RFID tag and its corresponding shields 32 in alignment with the tag 30 is greatly streamlined. In other words, the current invention allows a one-step installation where both the tag 30 and the shields 32 are adhered to a passport in close to perfect alignment with each other without having to first adhere a tag 30, then try to figure out a location to adhere shields 32 in order to align with the tag 30.

Figure 6:
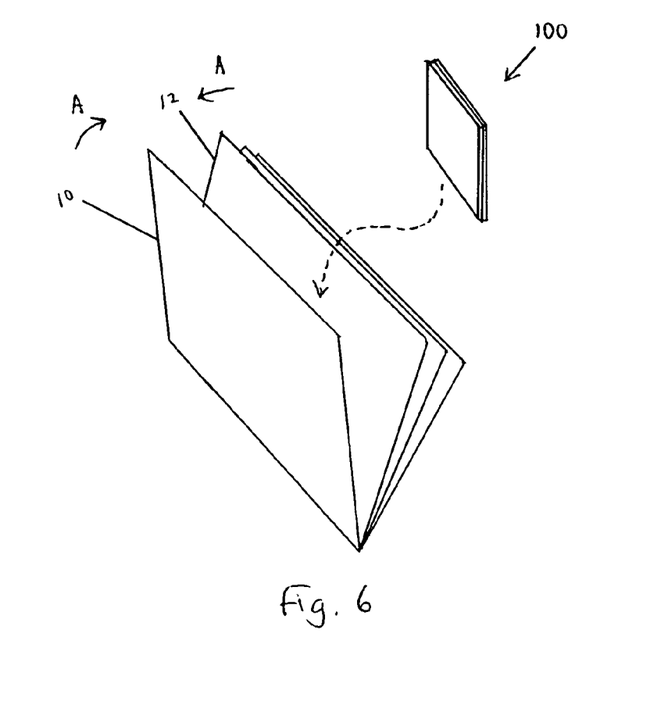
FIG. 6 is a perspective view of a two-part assembly being coupled to a passport according to an aspect of the inventive subject matter.
Figure 7:
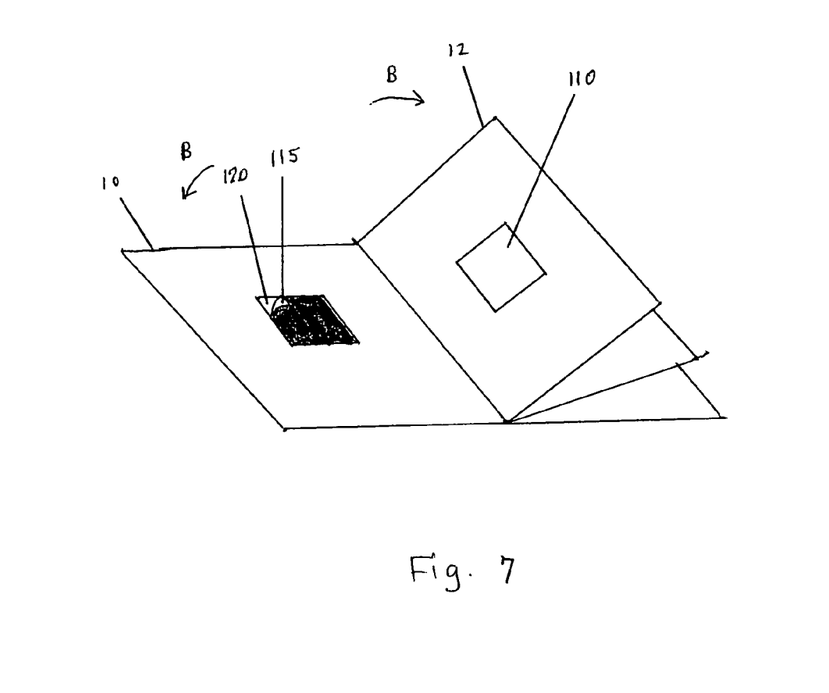
FIG. 7 is a perspective view of a two-part assembly after it is coupled to a passport and detached from each other, according to an aspect of the inventive subject matter.

Contemplated weak connectors can be a chemical connector, a mechanical connector, or a non-chemical and non-mechanical connector capable of bonding the first part 110 to the second part 120, yet sufficiently weak such that the first part 110 can readily detach from the second part 120 when desired. In one preferred aspect of the inventive subject matter, the weak connector 115 is a weak chemical adhesive layer temporarily adhering the two parts together. As illustrated in FIG. 6, in operation, the assembly 100 is inserted in between pages of a passport (one skilled in the art would appreciate that the assembly can also be inserted between the first or last page and its opposing binding of a passport/book). By closing the passport as shown by arrows A, strong adhesives 117 on both sides of the assembly 100 adhere to opposing pages. Now referring to FIG. 7, after both sides of the assembly 100 have securely adhered to opposing pages in the passport, the opposing pages are open (or separated) as shown by arrows B to break the weak bond between the first part 110 and the second part 120. Preferably, this weak adhesive 115 can be removed or peeled off as shown in FIG. 7 and be disposed off.

Alternatively, contemplated weak connectors 115 can also be a mechanical connector. Various configurations of mechanical connectors are possible to achieve the goal of temporarily coupling the first part 110 to the second part 120, before the two are detached from each other when opposing pages are separated. For example, the first part 110 and the second part 120 can be slightly taped together by an adhesive paper band.

Still further contemplated weak bond can include packaging the first and the second parts 110, 120 in materials that would allow the two parts to statically cling to each other. One skilled in the art would immediately appreciate many other known methods for detachably couple the first and second parts 110, 120 to achieve the intended goal as stated above.

Additionally, it should be appreciated that the RFID security system/assembly contemplated herein may be derivatized in numerous manners to accommodate various products and items in need of RFID security. For example, the above-described invention can be used to shield RFID tags in items such as books, publications, wallets, "smart card/key" (used as electronic cash, building access identification, patient identification, etc.), and personal electronics (e.g., cellular phones containing RFID tags, especially flip-open type cellular phones). One skilled in the art will immediately appreciate that the above described open book and closed book configuration can be applied to various other items where moving parts are available, or where a open/close cover structure can be provided to effectuate the same goal of interfering the reading of a RFID tag.

Thus, specific embodiments and applications of RFID tag shield security system have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A Radio Frequency Identification (RFID) tag security device, comprising:
   a first layer of conductive material coupled to an item having the RFID tag;
   wherein the first layer is capable of selectively interfering with a frequency transmission between the RFID tag and a RFID reader when the first layer is disposed in parallel to the RFID tag whereby when the first layer is separated from the RFID tag, the RFID tag is allowed to be read;
   a second layer of conductive material coupled to the item and positioned to sandwich the RFID tag with the first layer when the item is in a first configuration wherein the first and second layers are coupled to the item so that when the item is in a second configuration the frequency transmission between the reader and the tag is allowed;
the conductive material is an electrically conductive material and wherein intefering includes blocking a radio frequency transmission;
a spacing layer coupled to at least one of the first layer and the RFID tag, and wherein the spacing layer comprises a ferrite-based material or other material with high magnetic permeability and high resistively.

2. The device of claim 1, wherein the electrically conductive material is configured in at least one of foil, solid core, stranded core, sheet, and mesh.

3. The device of claim 1 wherein the first and second layers are coupled to each other in a book-like fashion, wherein the first configuration resembles a closed book, and wherein the second configuration resembles an open book.

4. The device of claim 3, wherein at least one of the first and second layers is flexible.

5. The device of claim 1 further comprising a spacing layer coupled to at least one of the first layer and the RFID tag, and wherein the spacing layer comprises a non-conducting dielectric material.

6. The device of claim 3, wherein the device is a jacket capable of retrofitting the item, and wherein the item is a passport or a book.

7. The device of claim 3, wherein the first layer is part of a binding of the item, and wherein the item is a book or a passport.

8. A method of attaching a RFID tag to a book or a passport, the method comprising the steps of:
providing a two-part RFID assembly having adhesives on its top and bottom sides wherein a first part of the assembly comprises an electrical conductive layer capable of disrupting a radio frequency transmission and further wherein a second part of the assembly comprises a RFID tag;
wherein the first and second parts are detachably coupled together;
opening the book or the passport;
adhering the assembly onto a page of the book or passport;
closing the book or passport to allow both the top and bottom sides of the assembly to adhere to the book or the passport; and
detaching the first pad from the second part by opening the book or the passport wherein the second part of the assembly further comprises a second electrical conductive layer positioned in parallel to the tag and a spacer positioned in parallel to the tag to minimize an effect of the second layer to the tag.

* * * * *

UNITED STATES PATENT AND TRADEMARK OFFICE
CERTIFICATE OF CORRECTION

| | |
|---|---|
| PATENT NO. | : 7,479,882 B2 |
| APPLICATION NO. | : 11/397521 |
| DATED | : January 20, 2009 |
| INVENTOR(S) | : Kevin Mahaffey |

Page 1 of 1

It is certified that error appears in the above-identified patent and that said Letters Patent is hereby corrected as shown below:

In the Claims

Column 9, line 6, delete "intefering" and insert --interfering--.

Signed and Sealed this
Eighteenth Day of August, 2015

Michelle K. Lee
*Director of the United States Patent and Trademark Office*